UNITED STATES PATENT OFFICE.

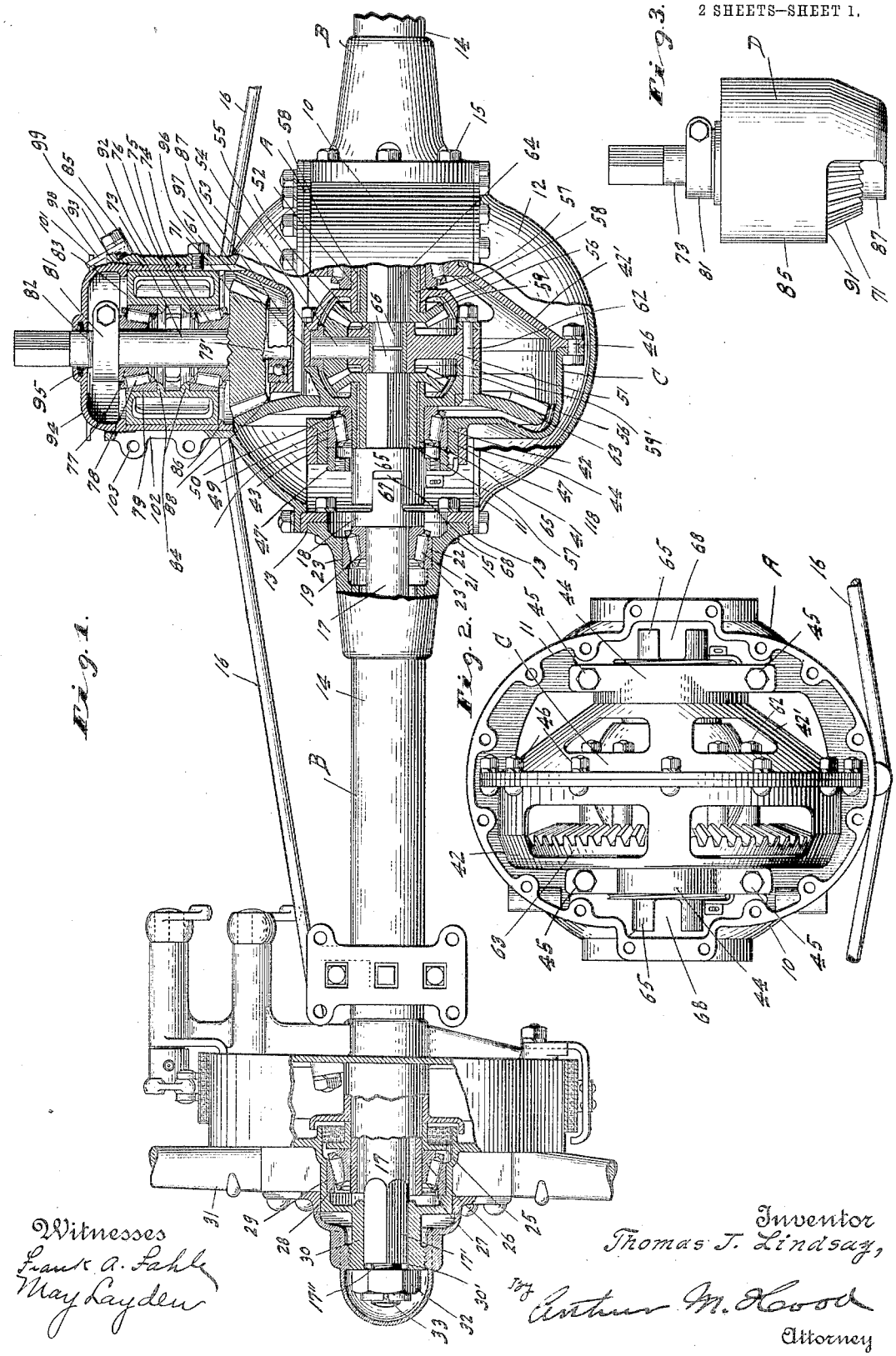

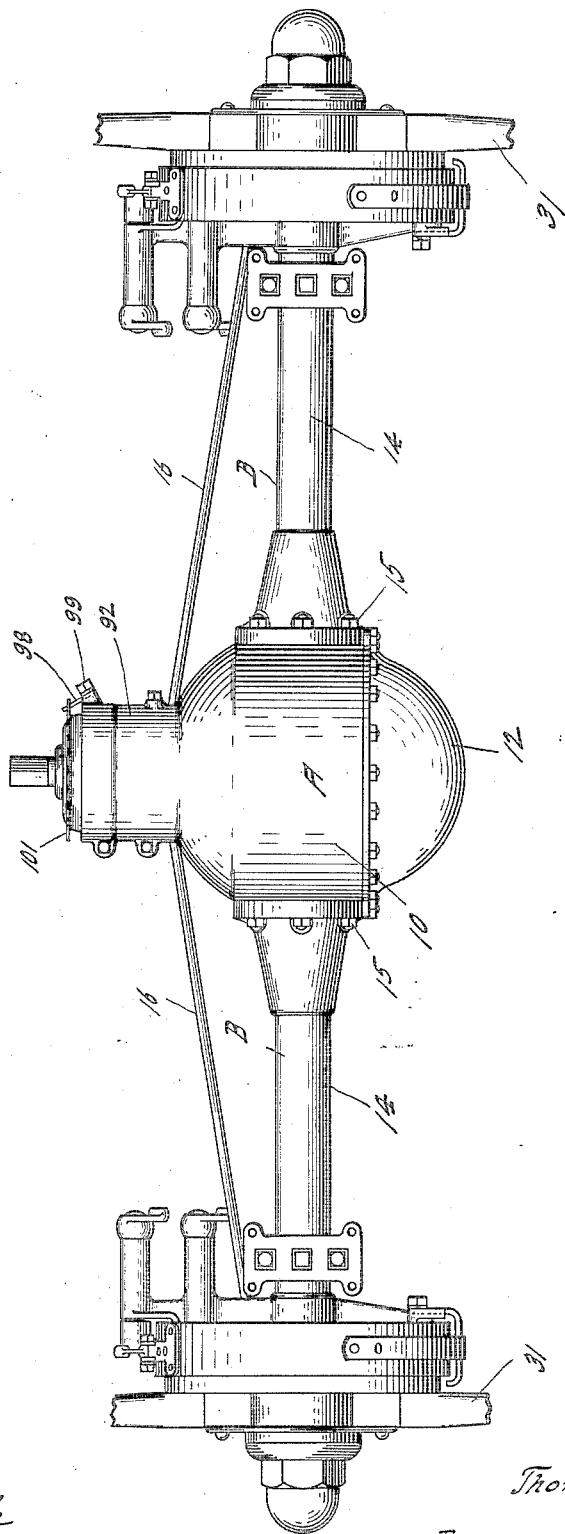

THOMAS J. LINDSAY, OF INDIANAPOLIS, INDIANA, ASSIGNOR TO LINDSAY AUTO PARTS COMPANY, A CORPORATION OF INDIANA.

DRIVING-AXLE.

1,097,653.

Specification of Letters Patent.    Patented May 26, 1914.

Application filed August 7, 1911. Serial No. 642,799.

*To all whom it may concern:*

Be it known that I, THOMAS J. LINDSAY, a citizen of the United States, residing at Indianapolis, in the county of Marion and State of Indiana, have invented a new and useful Driving-Axle, of which the following is a specification.

The object of my invention is to produce a driving axle-structure for automobiles in which the various component members necessary to such a structure may be produced in units which may be readily assembled together to produce a complete structure, said unit being individually separable from the structure for inspection, repair or replacement under such conditions that the bearings for the removed unit need not be disturbed in their adjustment. The structure is also such that the removal of any unit may be accomplished without disturbing any other unit.

The accompanying drawings illustrate an embodiment of my invention, Figure 1 being an axial section of the middle portion and one end portion of such a structure; Fig. 2 a rear elevation of the middle casing member and the inclosed differential unit, the rear or inspection cap having been removed; Fig. 3 an elevation of the driving pinion unit; and Fig. 4 a plan of the complete structure, the casing being slightly modified.

According to my present invention, my rear axle structure will be composed of five units which, for convenience, I shall refer to as units A, B, C and D, two units B being used in the structure.

*Unit A.*—Unit A will comprise a main hollow casing member 10 conveniently formed at one side with an opening 11 which, in practice, is conveniently in a plane parallel with the general axis of the structure and is so formed as to receive a removable inspection cap 12 which may be secured over opening 11 in an oil-tight manner. The opening 11, in the form shown, is of such size as to permit the ready extraction of the differential unit C, to be described. At opposite sides of member 10 I provide pockets or portions 13 which are formed to receive units B.

*Unit B.*—Each unit B comprises a tubular casing member, a rotating shaft and a traction wheel, as well as the bearings and necessary associated parts. The tubular casing member 14, of this unit, may be formed in a single piece or in a plurality of pieces connected in any manner suitable to meet the desires of the manufacturer and the needs of the structure into which the axle is to be incorporated and its inner end is seated in the pocket 13 and removably connected to the unit A by suitable bolts 15. The outer ends of the two units B may also be stiffened by suitable and ordinary truss rods 16, 16, in a well-known manner. Rotatably mounted in each tube 14 is a shaft 17 which at its inner end is provided with a head 18 against which abuts a bearing cone 19 which is preferably freely slipped upon the shaft, being held against movement thereon, in one direction only, by head 18. Mounted upon the bearing cone 19 is a series of conical bearing rollers 21 which coöperate with a bearing ring 22 seated in pocket 23 formed at the inner end of tube 14. The ring 22 may be slipped into pocket 23 and held thereby against movement outwardly (*i. e.*, toward the outer end of the tubular member), and the series of conical roller bearings 21 will be similarly restrained from such outward movement by the ring. Secured to, or carried by, the exterior of the tube 14, a short distance from its outer end, is a flange or shoulder 25 and slipped upon the end of the tube and abutting against the shoulder 25 is an outwardly presented bearing cone 26 upon which is arranged a series of conical bearing rollers 27. Coöperating with the bearing rollers 27 is a conical bearing ring 28, the larger diameter of which is presented inwardly toward unit B and this ring is seated in a plain pocket 29 formed in the hub 30 of the traction wheel 31, only the spokes of which are shown in the drawings. The hub 31 is provided axially with a polygonal or non-circular bore 30' adapted to slidingly fit a correspondingly shaped portion 17' of shaft 17. Shaft 17 is provided at its extreme end with a threaded shank 17" upon which is threaded a clamping nut 32 adapted to engage the outer end of the hub 30, any suitable means, such, for instance, as an ordinary fastening pin 33, being provided to prevent accidental rotation of the nut 32. The fit of portion 17' within bore 30' is an accurate sliding fit so that adjustment of hub 30 axially upon the shaft may be readily had and at the same time shaft 17 may impart its stiffness to the wheel 31. The bearings 26—27—28 are placed substantially in the axis of wheel 31 and, the two sets of bearing cones 27 and 21 being coned in the same direction, adjustment of the hub 30 upon shaft 17, by the single nut 32, will simultaneously adjust the bearings and maintain the necessary engagement between the shaft and the wheel. At the same time the wheel is given all the stiffness which would be imparted by the widely separated bearings, although the wheel itself is provided with but a single bearing. It will be noted that this unit B is of such character that the bearings may be carefully and accurately adjusted before assembly with the other units which go to make up the complete axle structure and that it may be attached or detached from the other units without disturbing the adjustment of the bearings.

*Unit C.*—The differential gearing is, in general, of a well known type, although in the particular form shown, there are some details of construction differing from differential gearing commonly in the market. Fundamentally, however, the differential gearing may be of any well known type and provided at its opposite ends with sleeves or journal bearings 41 to be journaled within a caging 42 which, in turn, is formed to be rigidly clamped in pockets 43 arranged within, and conveniently formed integral with, the casing member 10 of unit A, being clamped in said pockets by readily removable pocket caps 44 and clamping bolts 45.

The caging 42 is conveniently formed of two mating members 42 and 42' mating in a plane at right angles to the axis of the differential and detachably connected by bolts 46. Each of these caging members is provided with an axial sleeve or hub 47 formed for reception in pocket 43 and interiorly threaded to receive an adjusting ring 47' which abuts against a conified bearing ring 48 within which is mounted a series of conical bearing rollers 49 running upon a bearing cone 50 slipped freely upon the hub 41 of the differential gearing, the arrangement being such that the bearings for the differential gearing within the caging 42 may be readily and accurately adjusted before the differential unit C is placed within the axle structure. The particular differential gearing shown in the drawings has some features of desirable construction which I believe to be novel. The central spider 51 is provided with a central bore 52 and exteriorly is substantially cylindrical but its circumferential surface is provided at three or more points with slight depressions or pockets 53. Extending radially through the spider, from the bottom of the pocket 53, is a pin 54 upon which is journaled a beveled pinion 55, said pinion extending to opposite sides of the spider 51, as clearly indicated in Fig. 1. While a single one of the pinions 55 would be sufficient, so far as compensating action is concerned, it is the common and better practice to provide three of such pinions equally spaced. Meshing with the pinions 55 are the two central gears 56, 56 of the differential train. Each of these gears is faced at its inner end so as to abut against the ends of the hub of the spider 51 and each of said gears is provided with an elongated hub sleeve 57 which is formed into a journal bearing which is journaled within a bearing 58 formed within sleeve 41 of the differential main body. This main body comprises two mating members 59 and 59', each of which is provided with a sleeve 41, already described, and two of which mate with the spider 51, the member 59 being provided with axially projecting tongues 61 which project into and fill the pockets 53 and overlie the outer ends of pins 54 so that said pins need no other fastening means to retain them in place. The differential body members 59 and 59' are clamped together upon the spider 51 by means of bolts 62, said bolts also serving to clamp the main driving gear 63 of the differential gearing upon the body member 59'. The hubs of the central gears 56 of the differential gearing have axial bores to receive polygonal or non-circular shanks 64 of coupling heads 65, the shank of each coupling head at its inner end being provided with a circular portion 66 which is journaled within the bearing 52 at the center of spider 51. Coupling head 65 and head 18 of the adjacent shaft 17 are provided with mating portions 67 and 68, respectively, by means of which rotation of the coupling head 65 may be transmitted to the adjacent shaft, said connection, however, being of such character that the differential unit C may be readily extracted from between the inner ends of the shafts 17 without disturbing the bearings of said shaft and without moving the shafts axially. I prefer to make this connection of such character that the extraction of the differential unit may be accomplished without the necessity of manipulation of any portion directly connected either to the shaft or the coupling head, and such a connection is, therefore, shown in the drawings.

*Unit D.*—The main driving pinion 71 meshes with the main gear 63 of the differential train and this gear is firmly secured to, or preferably integral with, a short shaft 73. Slipped upon the shaft 73 is a bearing cone 74 receiving a series of conical rollers 75 upon which is placed a bearing ring 76. Shaft 73 also carries a bearing cone 77 upon which is a series of conical rollers 78 which lie within a conical bearing ring 79. The bearings are oppositely arranged upon shaft 73, and a single adjusting nut 81, threaded at 82 upon shaft 73, serves to determine the distance between the two cones 74 and 77. The two bearing rings 76 and 79 are oppositely arranged in the opposite ends of a cage 83, the two bearing rings abutting against oppositely arranged internal ribs 84 carried in the interior of the cage. Cage 83 is cylindrical exteriorly and slipped freely into a shell 85 which is provided at a proper point with an internal rib 86 against which the inner end of cage 83 may rest, said rib being so placed that the outer ends of shell 85 and cage 83 will be flush with each other, for a purpose which will appear. The inner end of shell 85 is formed into a retaining cup 87 to receive a bearing 88 for the inner tip 73' of shaft 73. The shell 85 is cut away at one side, at 91, in order to expose pinion 71 for proper meshing with gear 63, and cup 88 is so proportioned that it may be moved freely past the teeth of gear 63 so that said gear 63 need not be disturbed in the removal and reinsertion of the shell 85. Shell 85 is removably mounted within a tubular portion 92 of unit A and conveniently this tubular portion may be made integral with the casing member 10, (Fig. 4) although, if desired, it may be made upon a separable cap (Fig. 1) without departing from the spirit of my invention. The outer end of the tube 92 is threaded at 93 to receive a cap 94 which serves to close the end of the tube (having a dust proof joint 95 with shaft 73), and this cap, by engaging the adjacent ends of shell 85 and cage 83, will determine the adjustment of pinion 71 relative to gear 63. Relative turning of shell 85 and cage 83 within tube 93 may be prevented by a set screw 96 passing through a slot 97 in shell 85 and engaging the circumference of cage 83.

Any suitable means for retaining the cap 94 in adjusted position may be provided as, for instance, a retaining finger 98 held in place by bolt 99 and engaging suitable fingers 101 on the cap 94. Tube 93 may also be longitudinally split as indicated at 102 so that clamping bolts passed through openings 103 may clamp the tube around the shell 85.

From the preceding description, it will be noticed that each of the units A, B, C and D may be individually fabricated, assembled and adjusted and the complete axle structure may then be produced by a mere assembly of the units, such assembly, however, involving no adjustments of bearings.

If inspection, repair or replacement of any unit is desired, the result can be accomplished without disturbing any of the other units. Unit C may be readily extracted by first removing caps 12 and 44 and when so extracted, the various parts of the differential train may be adjusted and completely assembled within the cage 42 and all of the parts properly and accurately adjusted when the structure is readily accessible. It may then be placed within the axle structure without any special care as to its placing.

I claim as my invention:

1. A driving axle structure for automobiles comprising a main hollow casing member, a pair of oppositely extending tubular casing members detachably secured to the main casing member, a bearing carried by the inner end of each tubular member, a bearing arranged upon the outer end of each tubular member, a wheel journaled upon said last mentioned bearing, a shaft rotatably mounted within each tubular member and independently supported at its inner end by the bearing at the inner end of the tubular member, and a laterally-rigid, non-rotative, axially-adjustable connection between the outer end of each shaft and the adjacent wheel.

2. A driving axle structure for automobiles comprising a main hollow casing member, a pair of oppositely extending tubular casing members detachably secured to the main casing member, a cone bearing carried by the inner end of each tubular member, a similarly placed cone bearing arranged upon the outer end of each tubular member, a wheel journaled upon said last mentioned bearing, a shaft rotatably mounted within each tubular member and independently supported at its inner end by the bearing at the inner end of the tubular member, and a laterally rigid non-rotative connection between the outer end of each shaft and the adjacent wheel, said connection being axially shiftable whereby relative adjustment of the shaft and wheel will adjust the two bearings.

3. A driving axle structure for automobiles comprising a main hollow casing member, a pair of oppositely extending tubular casing members detachably secured to the main casing member, a bearing carried by the inner end of each tubular member, a bearing arranged upon the outer end of each tubular member, a wheel journaled upon said last mentioned bearing, a shaft rotatably mounted within each tubular member and independently supported at its inner end by the bearing at the inner end of the tubular member, a laterally rigid non-rotative connection between the outer end of each shaft and the adjacent wheel, a differential gearing mounted within the main casing member, independent bearings for said differential gearing within the main casing member, and a transversely separable driving connection between the center gears of the differential gearing and the adjacent inner ends of the shaft.

4. A driving axle structure for automobiles comprising a main hollow casing member, a pair of oppositely extending tubular casing members detachably secured to the main casing member, a cone bearing arranged at the inner end of each tubular member, a similarly placed cone bearing arranged upon the outer end of each tubular member, a wheel journaled upon said last mentioned bearing, a shaft rotatably mounted within each tubular member and supported at its inner end by the bearing at the inner end of the tubular member, a laterally rigid non-rotative connection between the outer end of each shaft and the adjacent wheel, said connection being axially shiftable whereby relative adjustment of the shaft and wheel will adjust the two bearings, a differential bearing mounted within the main casing member, independent bearings for said differential gearing within the main casing member, and a transversely separable driving connection between the center gears of the differential gearing and the adjacent inner ends of the shaft.

5. As an article of manufacture, a differential unit for driving axle structures, comprising a differential gearing supporting means formed for non-rotative and independent separable attachment within a supported structure, and thrust bearings for said differential gearing carried by said supporting means, said supporting means being provided with means for adjusting said bearings in the direction of thrust.

6. A driving axle structure comprising a main casing unit; a pair of oppositely extending tubular units each independently carrying a traction wheel upon its outer end, a rotatable shaft within its interior and laterally rigidly connected to the traction wheel at its outer end, and a bearing for said shaft within the inner end of said tubular unit; a differential unit comprising a cage independently removably mounted non-rotatably within the main casing unit, and a differential gearing journaled in said cage; and a driving-pinion unit comprising a driving pinion and shaft, bearings for said shaft, and a container for said bearings independently removably mounted in the main casing member.

7. In a driving axle structure, a tubular shell carrying a cup at its inner end, a bearing mounted in said cup, a pinion-shaft having its inner end supported in said bearing, a pinion on said shaft outside said bearing, a pair of oppositely arranged cone bearings sleeved upon said shaft outside the pinion, a single adjusting member arranged upon the shaft to simultaneously adjust the shaft and the last mentioned bearing, and a cage removably mounted within the shell and carrying said last mentioned bearings.

8. In a driving axle structure, a tubular shell carrying a cup at its inner end, a bearing mounted in said cup, a pinion-shaft having its inner end supported in said bearing, a pinion on said shaft outside said bearing, a pair of oppositely arranged cone bearings sleeved upon said shaft outside the pinion and a cage removably mounted within the shell and carrying said last mentioned bearings.

9. In a driving axle structure, a tubular shell carrying a cup at its inner end, a bearing mounted in said cup, a pinion-shaft having its inner end supported in said bearing, a pinion on said shaft outside said bearing, a pair of bearings upon said shaft outside the pinion, and a cage removably mounted within the shell and carrying said last mentioned bearings.

10. In a driving axle structure, a hollow axle casing, an independent shaft bearing within its interior, a wheel bearing upon its exterior at a point distant from the shaft bearing, a wheel journaled on the wheel bearing, a shaft journaled in the shaft bearing and within the casing, and a laterally rigid, axially adjustable driving connection between the shaft and wheel.

11. In a driving axle structure, a hollow axle casing, an independent shaft-bearing within its interior; means for holding said bearing against axial movement outwardly in said casing, a wheel bearing arranged upon the exterior of the outer end of the casing, means for holding said wheel bearing against axial movement inwardly on the casing, a wheel journaled on the wheel bearing, a shaft rotatably mounted within the casing and independently supported at its inner end in the shaft bearing, a non-rotative, laterally-rigid, axially-adjustable connection between the outer end of the shaft and the wheel, and a clamping nut mounted on the shaft and engaging the wheel for maintaining and adjusting the wheel, shaft and bearings in proper co-relation.

12. In a driving axle structure, a hollow axle casing, an independent conical shaft bearing within its interior, means for holding said bearing against axial movement outwardly in said casing, a similarly arranged conical wheel bearing arranged upon the exterior of the outer end of the casing, means for holding said wheel bearing against axial movement inwardly on the casing, a wheel journaled on the wheel bearing, a shaft rotatably mounted within the casing and independently supported at its inner end in the shaft bearing, a non-rotative, laterally-rigid, axially-adjustable connection between the outer end of the shaft and the wheel, and a clamping nut mounted on the shaft and engaging the wheel for maintaining and adjusting the wheel, shaft and bearings in proper co-relation.

13. In a driving axle structure, a main casing member having cage-receiving pockets, a differential caging laterally removably and non-rotatively mounted in said arranged upon shaft 73, and a single adjusting nut 81, threaded at 82 upon shaft 73, serves to determine the distance between the two cones 74 and 77. The two bearing rings 76 and 79 are oppositely arranged in the opposite ends of a cage 83, the two bearing rings abutting against oppositely arranged internal ribs 84 carried in the interior of the cage. Cage 83 is cylindrical exteriorly and slipped freely into a shell 85 which is provided at a proper point with an internal rib 86 against which the inner end of cage 83 may rest, said rib being so placed that the outer ends of shell 85 and cage 83 will be flush with each other, for a purpose which will appear. The inner end of shell 85 is formed into a retaining cup 87 to receive a bearing 88 for the inner tip 73' of shaft 73. The shell 85 is cut away at one side, at 91, in order to expose pinion 71 for proper meshing with gear 63, and cup 88 is so proportioned that it may be moved freely past the teeth of gear 63 so that said gear 63 need not be disturbed in the removal and reinsertion of the shell 85. Shell 85 is removably mounted within a tubular portion 92 of unit A and conveniently this tubular portion may be made integral with the casing member 10, (Fig. 4) although, if desired, it may be made upon a separable cap (Fig. 1) without departing from the spirit of my invention. The outer end of the tube 92 is threaded at 93 to receive a cap 94 which serves to close the end of the tube (having a dust proof joint 95 with shaft 73), and this cap, by engaging the adjacent ends of shell 85 and cage 83, will determine the adjustment of pinion 71 relative to gear 63. Relative turning of shell 85 and cage 83 within tube 93 may be prevented by a set screw 96 passing through a slot 97 in shell 85 and engaging the circumference of cage 83.

Any suitable means for retaining the cap 94 in adjusted position may be provided as, for instance, a retaining finger 98 held in place by bolt 99 and engaging suitable fingers 101 on the cap 94. Tube 93 may also be longitudinally split as indicated at 102 so that clamping bolts passed through openings 103 may clamp the tube around the shell 85.

From the preceding description, it will be noticed that each of the units A, B, C and D may be individually fabricated, assembled and adjusted and the complete axle structure may then be produced by a mere assembly of the units, such assembly, however, involving no adjustments of bearings.

If inspection, repair or replacement of any unit is desired, the result can be accomplished without disturbing any of the other units. Unit C may be readily extracted by first removing caps 12 and 44 and when so extracted, the various parts of the differential train may be adjusted and completely assembled within the cage 42 and all of the parts properly and accurately adjusted when the structure is readily accessible. It may then be placed within the axle structure without any special care as to its placing.

I claim as my invention:

1. A driving axle structure for automobiles comprising a main hollow casing member, a pair of oppositely extending tubular casing members detachably secured to the main casing member, a bearing carried by the inner end of each tubular member, a bearing arranged upon the outer end of each tubular member, a wheel journaled upon said last mentioned bearing, a shaft rotatably mounted within each tubular member and independently supported at its inner end by the bearing at the inner end of the tubular member, and a laterally-rigid, non-rotative, axially-adjustable connection between the outer end of each shaft and the adjacent wheel.

2. A driving axle structure for automobiles comprising a main hollow casing member, a pair of oppositely extending tubular casing members detachably secured to the main casing member, a cone bearing carried by the inner end of each tubular member, a similarly placed cone bearing arranged upon the outer end of each tubular member, a wheel journaled upon said last mentioned bearing, a shaft rotatably mounted within each tubular member and independently supported at its inner end by the bearing at the inner end of the tubular member, and a laterally rigid non-rotative connection between the outer end of each shaft and the adjacent wheel, said connection being axially shiftable whereby relative adjustment of the shaft and wheel will adjust the two bearings.

3. A driving axle structure for automobiles comprising a main hollow casing member, a pair of oppositely extending tubular casing members detachably secured to the main casing member, a bearing carried by the inner end of each tubular member, a bearing arranged upon the outer end of each tubular member, a wheel journaled upon said last mentioned bearing, a shaft rotatably mounted within each tubular member and independently supported at its inner end by the bearing at the inner end of the tubular member, a laterally rigid non-rotative connection between the outer end of each shaft and the adjacent wheel, a differential gearing mounted within the main casing member, independent bearings for said differential gearing within the main casing member, and a transversely separable driving connection between the center gears of the differential gearing and the adjacent inner ends of the shaft.

4. A driving axle structure for automobiles comprising a main hollow casing member, a pair of oppositely extending tubular casing members detachably secured to the main casing member, a cone bearing arranged at the inner end of each tubular member, a similarly placed cone bearing arranged upon the outer end of each tubular member, a wheel journaled upon said last mentioned bearing, a shaft rotatably mounted within each tubular member and supported at its inner end by the bearing at the inner end of the tubular member, a laterally rigid non-rotative connection between the outer end of each shaft and the adjacent wheel, said connection being axially shiftable whereby relative adjustment of the shaft and wheel will adjust the two bearings, a differential bearing mounted within the main casing member, independent bearings for said differential gearing within the main casing member, and a transversely separable driving connection between the center gears of the differential gearing and the adjacent inner ends of the shaft.

5. As an article of manufacture, a differential unit for driving axle structures, comprising a differential gearing supporting means formed for non-rotative and independent separable attachment within a supported structure, and thrust bearings for said differential gearing carried by said supporting means, said supporting means being provided with means for adjusting said bearings in the direction of thrust.

6. A driving axle structure comprising a main casing unit; a pair of oppositely extending tubular units each independently carrying a traction wheel upon its outer end, a rotatable shaft within its interior and laterally rigidly connected to the traction wheel at its outer end, and a bearing for said shaft within the inner end of said tubular unit; a differential unit comprising a cage independently removably mounted non-rotatably within the main casing unit, and a differential gearing journaled in said cage; and a driving-pinion unit comprising a driving pinion and shaft, bearings for said shaft, and a container for said bearings independently removably mounted in the main casing member.

7. In a driving axle structure, a tubular shell carrying a cup at its inner end, a bearing mounted in said cup, a pinion-shaft having its inner end supported in said bearing, a pinion on said shaft outside said bearing, a pair of oppositely arranged cone bearings sleeved upon said shaft outside the pinion, a single adjusting member arranged upon the shaft to simultaneously adjust the shaft and the last mentioned bearing, and a cage removably mounted within the shell and carrying said last mentioned bearings.

8. In a driving axle structure, a tubular shell carrying a cup at its inner end, a bearing mounted in said cup, a pinion-shaft having its inner end supported in said bearing, a pinion on said shaft outside said bearing, a pair of oppositely arranged cone bearings sleeved upon said shaft outside the pinion and a cage removably mounted within the shell and carrying said last mentioned bearings.

9. In a driving axle structure, a tubular shell carrying a cup at its inner end, a bearing mounted in said cup, a pinion-shaft having its inner end supported in said bearing, a pinion on said shaft outside said bearing, a pair of bearings upon said shaft outside the pinion, and a cage removably mounted within the shell and carrying said last mentioned bearings.

10. In a driving axle structure, a hollow axle casing, an independent shaft bearing within its interior, a wheel bearing upon its exterior at a point distant from the shaft bearing, a wheel journaled on the wheel bearing, a shaft journaled in the shaft bearing and within the casing, and a laterally rigid, axially adjustable driving connection between the shaft and wheel.

11. In a driving axle structure, a hollow axle casing, an independent shaft-bearing within its interior; means for holding said bearing against axial movement outwardly in said casing, a wheel bearing arranged upon the exterior of the outer end of the casing, means for holding said wheel bearing against axial movement inwardly on the casing, a wheel journaled on the wheel bearing, a shaft rotatably mounted within the casing and independently supported at its inner end in the shaft bearing, a non-rotative, laterally-rigid, axially-adjustable connection between the outer end of the shaft and the wheel, and a clamping nut mounted on the shaft and engaging the wheel for maintaining and adjusting the wheel, shaft and bearings in proper co-relation.

12. In a driving axle structure, a hollow axle casing, an independent conical shaft bearing within its interior, means for holding said bearing against axial movement outwardly in said casing, a similarly arranged conical wheel bearing arranged upon the exterior of the outer end of the casing, means for holding said wheel bearing against axial movement inwardly on the casing, a wheel journaled on the wheel bearing, a shaft rotatably mounted within the casing and independently supported at its inner end in the shaft bearing, a non-rotative, laterally-rigid, axially-adjustable connection between the outer end of the shaft and the wheel, and a clamping nut mounted on the shaft and engaging the wheel for maintaining and adjusting the wheel, shaft and bearings in proper co-relation.

13. In a driving axle structure, a main casing member having cage-receiving pockets, a differential caging laterally removably and non-rotatively mounted in said pockets, differential-supporting bearings arranged in said caging, and a differential-gearing rotatably mounted in said bearings, said caging being independent of all gearing and bearings other than those of the differential and forming no external part of the main casing.

14. In a driving axle structure, a main casing unit, a differential-gearing unit removably mounted in said main casing unit, and a pair of oppositely extending shaft units, each of said shaft units comprising a tubular casing member detachably connected to the main casing member so as to be detachable therefrom while leaving the main casing unit intact, and a power transmitting shaft rotatably mounted within and carried by said tubular casing member, the said several units being so associated as to form a driving connection between the differential gearing unit and the shafts of the shaft units.

15. In a driving axle structure, a main casing unit, a differential-gearing unit removably mounted in said main casing unit, a pair of oppositely extending shaft units each of said shaft units comprising a tubular casing member detachably connected to the main casing member and a power transmitting shaft rotatably mounted within and carried by said tubular casing member, the said several units being so associated as to form a driving connection between the differential gearing unit and the shafts of the shaft units, and a driving pinion unit removably mounted within the main casing unit and meshing with the differential gearing unit, said pinion unit comprising bearings for the rotative support of the pinion and being bodily adjustable within the main casing unit without interference with the adjustment of the supporting bearings for the pinion.

16. A driving axle structure comprising an inclosing casing, a differential-gearing unit mounted therein, and comprising an inclosing caging carrying supporting bearings for the differential gearing, a driving pinion unit also mounted within the casing and comprising supporting bearings for the driving pinion, and means for bodily adjusting one of said units relative to the other without disturbing the adjustment of the rotation-permitting bearings.

17. A driving axle structure comprising a main hollow casing member, a differential gearing mounted in said main casing member, a pair of oppositely extending shaft units detachably connected to the main casing member, each of said shaft units comprising a tubular casing member and a power transmitting shaft rotatively supported in each tubular casing member independent of the differential gearing but having a driving connection therewith, and a traction wheel journaled upon the outer end of each of said shaft units and non-rotatively connected with the shaft thereof.

18. A driving axle structure comprising a main hollow casing member, a differential gearing mounted in said main casing member, and a pair of oppositely extending shaft units detachably connected to the main casing member, each of said shaft units comprising a tubular casing member and a power transmitting shaft rotatively supported in each tubular casing member independent of the differential gearing but having a driving connection therewith.

19. In a driving axle structure, a main casing unit, a differential-gearing unit removably mounted in said main casing unit, and a pair of oppositely extended shaft units, each of said shaft units comprising a tubular casing member detachably connected to the main casing member so as to be detachable therefrom while leaving the main casing unit intact and a power transmitting shaft rotatably mounted within and carried by said tubular casing member, the said several units being so associated as to form a driving connection between the differential-gearing unit and the shafts of the shaft units, and said driving connection being transversely separable whereby said differential-gearing unit is removable from the main casing unit without requiring longitudinal movement of said power transmitting shafts.

20. In a driving axle structure, a main casing unit, a differential-gearing unit removably mounted in said main casing unit, and a pair of oppositely extended shaft units, each of said shaft units comprising a tubular casing member detachably connected to the main casing member so as to be detachable therefrom while leaving the main casing unit intact, and a power transmitting shaft rotatably mounted within and carried by said tubular casing member, the said several units being so associated as to form a driving connection between the differential-gearing unit and the shafts of the shaft units, and said driving connection being axially separable whereby said shaft units are removable axially of the shafts without requiring a movement of said differential-gearing unit.

21. In a driving axle structure, a main casing unit; a differential-gearing unit removably mounted in said main casing unit, said differential-gearing unit comprising a differential gearing, supporting bearings therefor, and means for adjusting said bearings in said unit independently of said main casing member; and a pair of power transmitting shafts extending oppositely from said differential-gearing unit and separably attached to the differential gearing.

22. In a driving axle structure, a main casing unit, a differential-gearing unit removably mounted in said main casing unit, said differential-gearing unit comprising a differential-gearing and a unitary supporting structure therefor, and a pair of oppositely extending shaft units, each of said shaft units comprising a tubular casing member detachably connected to the main casing member and a power-transmitting shaft rotatably mounted within said tubular casing member, the several units being so associated as to form a driving connection between the differential-gearing unit and the shafts of the shaft units.

23. In a driving axle structure, a main casing unit; a differential-gearing unit removably mounted in said main casing unit, said differential-gearing unit comprising a differential gearing, thrust bearings therefor, supports for said bearings, and adjusting means coöperating with said supports for adjusting the bearings in the direction of thrust; and a pair of power transmitting shafts oppositely extending from said differential-gearing unit and separably attached to the differential-gearing.

24. In a driving axle structure, a main casing unit; a differential-gearing unit removably mounted in said main casing unit, said differential-gearing unit comprising a differential gearing, thrust bearings therefor, and abutments for said bearings, said abutments being adjustable in the direction of thrust and being separable from the main casing unit with the rest of said differential-gearing unit; and a pair of power transmitting shafts extending oppositely from said differential-gearing unit and separably attached to said differential gearing.

25. The combination with a tubular axle casing having a central portion and laterally projecting tubular portions, of a differential-gearing unit comprising a differential-gearing, thrust bearings for controlling the axial position of the differential-gearing as a whole, and abutments for said thrust bearings, such abutments being adjustable in the line of thrust, and said differential-gearing unit, comprising said differential-gearing, said thrust bearings, and said abutments, being removable as a unit from said tubular axle casing independently of the laterally projecting portions of the latter.

26. In a driving axle structure, a main casing unit; a differential-gearing unit mounted in said main casing unit and comprising a differential-gearing and supports therefor, said differential-gearing unit being removable as a unit from the main casing unit; a driving pinion unit removably mounted in said main casing unit and comprising a driving pinion and supports therefor; and a pair of power transmitting shafts extending oppositely from said differential-gearing unit and separably attached to said differential gearing.

27. The combination of a tubular axle casing having a central portion and laterally projecting tubular portions, of a differential-gearing unit comprising a differential gearing and a unitary supporting structure therefor, shaft sections rotatable within said laterally projecting tubular portions of said tubular axle casing, said differential-gearing unit, comprising said differential gearing and said unitary supporting structure, being removable as a unit from said tubular axle casing independently of the laterally projecting portions of the latter.

In witness whereof, I, have hereunto set my hand and seal at Indianapolis, Indiana, this fifth day of August, A. D. one thousand nine hundred and eleven.

THOMAS J. LINDSAY. [L. S.]

Witnesses:
ARTHUR M. HOOD,
FRANK A. FAHLE.